United States Patent
Susairaj et al.

(10) Patent No.: US 12,242,458 B2
(45) Date of Patent: Mar. 4, 2025

(54) TRANSACTIONAL QUERY PROCESSING IN EXTERNAL TABLES

(71) Applicant: ORACLE INTERNATIONAL CORPORATION, Redwood Shores, CA (US)

(72) Inventors: Margaret M. Susairaj, Sugar Land, TX (US); Dmitry Mikhailovich Potapov, Los Gatos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 402 days.

(21) Appl. No.: 17/588,844

(22) Filed: Jan. 31, 2022

(65) Prior Publication Data

US 2023/0244652 A1    Aug. 3, 2023

(51) Int. Cl.
  *G06F 16/245* (2019.01)
  *G06F 16/23* (2019.01)

(52) U.S. Cl.
  CPC ........ *G06F 16/2365* (2019.01); *G06F 16/245* (2019.01)

(58) Field of Classification Search
  CPC ................ G06F 16/245; G06F 16/2365
  See application file for complete search history.

(56) References Cited

U.S. PATENT DOCUMENTS

| | | |
|---|---|---|
| 5,596,745 A | 1/1997 | Lai |
| 5,870,743 A | 2/1999 | Cohen |
| 6,282,039 B1 | 8/2001 | Bartlett |
| 6,922,708 B1 | 7/2005 | Sedlar |
| 7,072,894 B2 | 7/2006 | Loy |
| 7,082,435 B1 | 7/2006 | Guzman |
| 7,418,439 B2 | 8/2008 | Wong |
| 7,610,268 B2 | 10/2009 | Rossiter |
| 7,672,981 B1 | 3/2010 | Faibish |
| 8,239,486 B2 | 8/2012 | Susairaj |
| 8,566,361 B2 | 10/2013 | Zha et al. |
| 9,881,170 B2 | 1/2018 | Morris |
| 10,817,382 B2 | 10/2020 | Sekar et al. |
| 2003/0105928 A1 | 6/2003 | Ash |

(Continued)

FOREIGN PATENT DOCUMENTS

CN    106815251 B    9/2019

OTHER PUBLICATIONS

Potapov, U.S. Appl. No. 14/733,691, filed Jun. 8, 2015, Office Action, Jul. 5, 2018.

(Continued)

*Primary Examiner* — Alicia M Willoughby
(74) *Attorney, Agent, or Firm* — Hickman Becker Bingham Ledesma LLP

(57) ABSTRACT

Consistent External Table Access maintains transactional consistency for queries that access external tables stored in a DBFS. This ability is achieved by bypassing the OS. One or more database processes executing a query that access an external table stored in a DBFS access the database-file table like other database tables in the DBMS that can be accessed to execute a query. Based on metadata stored in the DBMS regarding how an external table is stored in a DBFS, a DBMS is able to marshal database processes that access database-file tables directly to execute a query.

16 Claims, 9 Drawing Sheets

(56) References Cited

U.S. PATENT DOCUMENTS

| | | | |
|---|---|---|---|
| 2003/0135511 | A1 | 7/2003 | Anderson et al. |
| 2007/0088706 | A1 | 4/2007 | Goff |
| 2008/0091743 | A1 | 4/2008 | Goff |
| 2009/0037512 | A1 | 2/2009 | Barsness |
| 2011/0208911 | A1 | 8/2011 | Taguchi et al. |
| 2012/0323947 | A1 | 12/2012 | Bice |
| 2014/0337393 | A1* | 11/2014 | Burchall ............ G06F 16/2379 707/826 |
| 2015/0019559 | A1 | 1/2015 | Maquaire |
| 2015/0254257 | A1 | 9/2015 | Kritchko |
| 2015/0356158 | A1 | 12/2015 | Potapov et al. |
| 2016/0110266 | A1 | 4/2016 | Nara et al. |
| 2016/0117337 | A1 | 4/2016 | Aron |
| 2016/0196530 | A1 | 7/2016 | Staffin |
| 2016/0224550 | A1* | 8/2016 | Morris ................ G06F 16/9032 |
| 2017/0351585 | A1* | 12/2017 | Bourbonnais .......... G06F 16/27 |
| 2018/0081767 | A1* | 3/2018 | He ..................... G06F 11/1666 |
| 2018/0150496 | A1* | 5/2018 | Kim .................... G06F 16/2365 |
| 2018/0322136 | A1 | 11/2018 | Carpentier |
| 2019/0163405 | A1 | 5/2019 | Israni et al. |
| 2019/0369895 | A1 | 12/2019 | Israni et al. |
| 2020/0050692 | A1* | 2/2020 | Antonopoulos .... G06F 16/2322 |
| 2021/0240583 | A1 | 8/2021 | Upadhyay et al. |
| 2022/0164320 | A1 | 5/2022 | Raghunathan et al. |
| 2022/0164321 | A1 | 5/2022 | Raghunathan et al. |
| 2022/0164322 | A1 | 5/2022 | Raghunathan et al. |
| 2023/0376479 | A1* | 11/2023 | Freedman ............. G06F 16/211 |

OTHER PUBLICATIONS

Potapov, U.S. Appl. No. 14/733,691, filed Jun. 8, 2020, Notice of Allowance, Oct. 20, 2020.
Potapov, U.S. Appl. No. 14/733,691, filed Jun. 8, 2015, Office Action, May 7, 2020.
Potapov, U.S. Appl. No. 14/733,691, filed Jun. 8, 2015, Office Action, Jul. 28, 2017.
Potapov, U.S. Appl. No. 14/733,691, filed Jun. 8, 2015, Final Office Action, Nov. 18, 2019.
Potapov, U.S. Appl. No. 14/733,691, filed Jun. 8, 2015, Office Action, Jun. 25, 2019.
Potapov, U.S. Appl. No. 14/733,691, filed Jun. 8, 2015, Interview Summary, Oct. 27, 2017.
Potapov, U.S. Appl. No. 14/733,691, filed Jun. 8, 2015, Interview Summary, Oct. 11, 2018.
Potapov, U.S. Appl. No. 14/733,691, filed Jun. 8, 2015, Interview Summary, Mar. 20, 2019.
Potapov, U.S. Appl. No. 14/733,691, filed Jun. 8, 2015, Final Office Action, Dec. 31, 2018.
Potapov, U.S. Appl. No. 14/733,691, filed Jun. 8, 2015, Final Office Action, Dec. 13, 2017.
Potapov, U.S. Appl. No. 14/733,691, filed Jun. 8, 2015, Advisory Action, Apr. 16, 2019.
Zhao, D., 'HyCache: A Hybrid User-Level File System with SSD Caching', Dept of Comp. Science, Illinois Inst. of Tech, Chicago, IL, http://datasys.cs.iit.edu/reports/2012_Qual-IIT_HyCache.pdf, 11pgs.
Stepanov, Konstantin, 'fusqlfs—FUSE file system to mount DB and provide tools to control and admin it', 2010, printed on Oct. 14, 2020 https://github.com/kstep/fusqlfs, 8pgs.
Rajgarhia, A., et al., 'Performance and Extension of User Space File Systems', SAC '09 Mar. 22-26, 10, 2010, Sierre, Switzerland, https://core.ac.uk/download/pdf/193586624.pdf, 2010 ACM, 8pgs.
Pavlinusic, Dobrica, 'Fuse::DBI—mount your database as filesystem and use it', https://www.rot13.org/~dpavlin/fuse_dbi.html, updated Jan. 8, 2016. 9pgs.
'Makes a file system available for use', IBM Search in AIX 7.1 mount Command, Purpose, printed Oct. 14, 2020, https://www.ibm.com/docs/en/aix/7.1?topic=m-mount-command, 26pgs.
Kashyap, S., et al., 'Improving Database Performance With AIX Concurrent I/O', IBM corp 2003, https://pdfs.semanticscholar.org/9e86/832bc2639ee331f091b61cbcc5f84847cc4f.pdf, May 27, 2003, 13pgs.
'Dimensions CM, UNIX Installation Guide', 2019 Micro Focus, https://admhelp.microfocus.com/dimensionscm/en/14.5.1/PDF/dmcm_unix_installation_guide.pdf, updtd Dec. 9, 2019; 188pgs.
Di Pierro, Massimo, 'WEB2PY Complete Reference Manual, 5th Edition', downloaded from http://web2py.com/books/default/chapter/29/13/deployment-recipes?search=Daemon, build date Mar. 3, 2013. 614pgs.
'Atomic Commit in SQLite', SQLite, printed Oct. 12, 2020, https://sqlite.org/atomiccommit.html#section_3_6, 25pgs.
Raghunathan, U.S. Appl. No. 17/387,718, filed Jul. 28, 2021, Non-Final Rejection, May 18, 2023.
Raghunathan, U.S. Appl. No. 17/387,724, filed Jul. 28, 2021, Notice of Allowance and Fees Due, Sep. 1, 2023.
Raghunathan, U.S. Appl. No. 17/387,718, filed Jul. 28, 2021, Notice of Allowance and Fees Due, Sep. 7, 2023.

* cited by examiner

FIG. 3

DDL STATEMENT 301

```
CREATE TABLE PARTNERSALES_A (
  PRODUCT char(30),
  AMOUNT currency,
  DATE date
)
ORGANIZATION EXTERNAL (
  DIRECTORY '/AllPartnersSales'
  ACCESS PARAMETERS (
    RECORD DELIMITED BY newline
    FIELDS (
      PRODUCT position(1 : 30),
      AMOUNT position(31),
      DATE position(31 : 40)
    )
  )
)
LOCATION (PartnerSales_A)
```

TRANSACTIONAL QUERY PROCESSING IN EXTERNAL TABLES

RELATED APPLICATIONS

The present application is related to the following patent applications, which are incorporated herein by reference respectively in entirety: U.S. patent application Ser. No. 14/733,691, Storage-Side Scanning on Non-Natively Formatted Data, filed by Dmitry Mikhailovich Potapov, et al. on Jun. 8, 2015; U.S. patent application Ser. No. 10/452,164, Transaction-Aware Caching for Access Control Metadata, filed by David J. Long, et al. on May 30, 2003; U.S. patent application Ser. No. 17/387,718, Scalable Framework for Managing Concurrent Accesses to Database File Systems, filed by Parthasarathy Elangadu Raghunathan, et al. on Jul. 28, 2021.

FIELD OF THE INVENTION

The present invention relates to transactional processing within a database system.

BACKGROUND

A database management system (DBMS) controls access to data in a database. The DBMS is configured to receive and process a variety of database commands, which often include queries.

Transactional Consistency

An important capability for a DBMS that executes queries against a database is transactional consistency. In transactional consistency, a query is executed to generate results that are consistent with a target state of the database as it existed at a point in time. Transactional consistency is provided even as the database changes, transitioning through a number of database states while executing the query.

Transactional consistency is provided as a part of the overall transaction processing capability of the DBMS. There are many complicated implementation features used to implement transactional processing and transactional consistency. Among them is the generation and use of transactional metadata to compute queries.

An example of such transactional metadata includes change records that record changes made by transactions to database data. Another example of transactional metadata is embedded transactional metadata stored within the database data, the embedded transactional metadata describing transactions that changed the database data. Implementation features for transactional processing within a DBMS are typically nonstandard and internal to a particular vendor's DBMS.

Transactional metadata is one of many other complicated implementation features used to implement transactional processing. Others include concurrency control mechanisms, such as row locking and Lamport clock mechanisms. Such mechanisms are also internal to a particular vendor's DBMS.

External Tables

A DBMS may provide a table abstraction of data from an "external data source" that is not fully formatted according to the native database storage format of database data of the DBMS. Such a table is referred to herein as an external table. The external data source may be a file ("external table file") stored in a storage system, such as a file containing lines of comma delimited fields.

A DBMS may define an external table in response to receiving a DDL (Data Definition Language) statement that describes the external table. The DDL statement specifies one or more columns for the external table ("DBMS table columns") and an external data source of the external table, such as an external table file in a file storage system.

Queries that access external tables are not evaluated with complete transactional consistency. Transactional consistency cannot be provided for an external data source that is changing because implementation features needed to implement transactional processing cannot be applied to the external data source. For example, there may be no transactional metadata for the external data source that is usable by a DBMS.

Described herein is an approach for providing transactional consistency for queries that access external tables.

BRIEF DESCRIPTION OF THE DRAWINGS

In the drawings:

FIG. 3 is a diagram depicting an illustrative database definition language statement for defining an external table according to an embodiment of the present invention.

DETAILED DESCRIPTION

Figure 1:
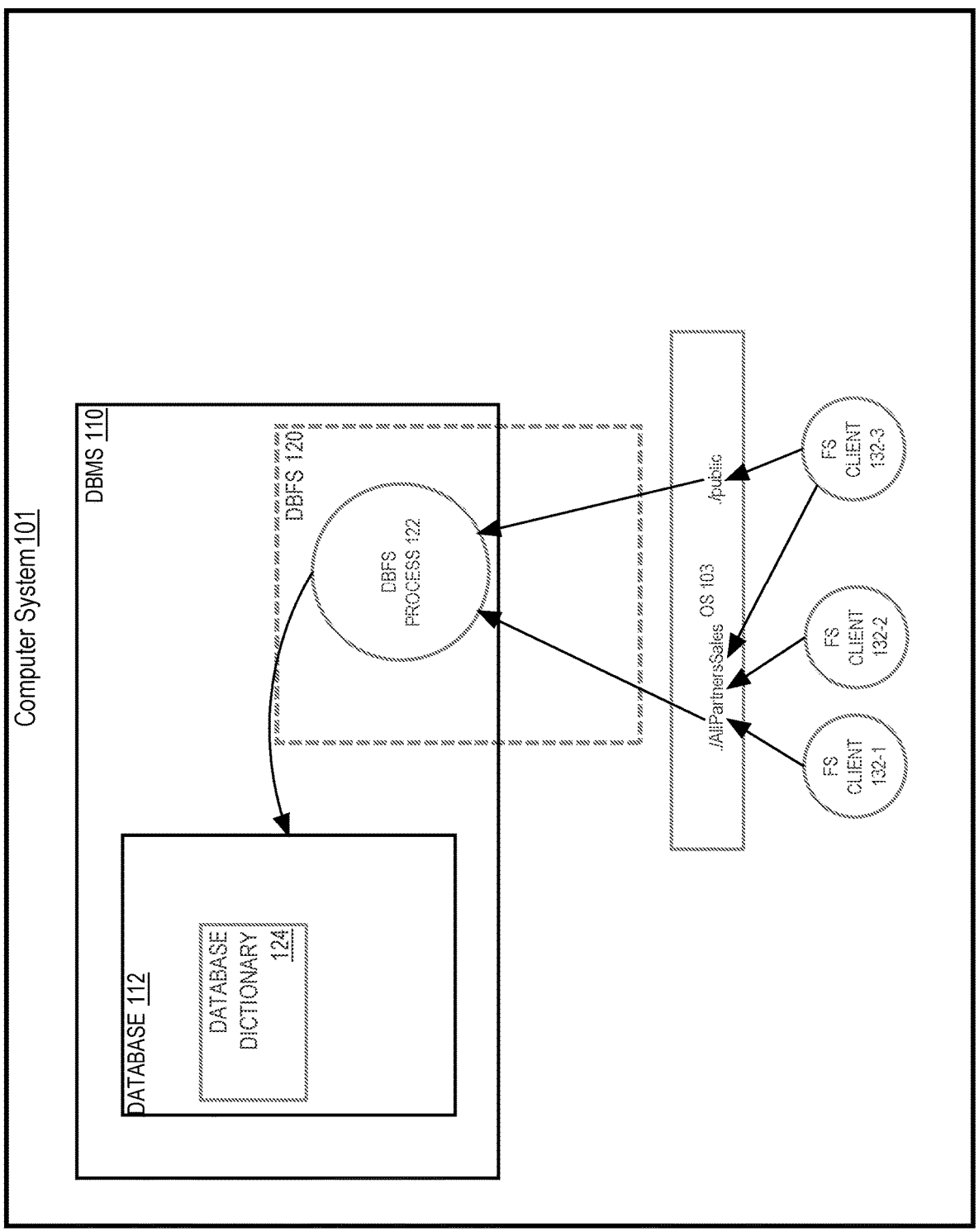
FIG. 1 is a diagram of a DBMS hosting a database file system according to an embodiment of the present invention that may be implemented.

In the following description, for the purposes of explanation, numerous specific details are set forth in order to provide a thorough understanding of the present invention. It will be apparent, however, that the present invention may be practiced without these specific details.

General Overview

Described herein are approaches for providing transactional consistency to queries that reference external tables. The approaches are referred to herein as Consistent External Table Access. Consistent External Table Access exploits a technology referred to herein as a database file system ("DBFS").

A DBFS is a file system ("FS") that stores files in a database table (database-file table) that is managed by a DBMS. A DBFS is accessible via FS APIs of an operating system (OS) like other FSs exposed by the OS. Database processes (e.g. processes running in a database session) and non-database processes may access a DBFS by invoking FS APIs provided by the OS. Invoking a FS API of a DBFS entails invoking the FS software layer of the OS, which then invokes the software layer of the DBMS. The software layer of the DBMS is executed by a database process of the DBMS that is referred to herein as a DBFS process.

Because a DBFS system stores a file in a database-file table, a DBFS process returns file data from the database-file table using transactional consistency. Specifically, the file data returned is consistent with a particular database state represented by a logical time, such as a system change number (SCN). Database states are associated with an ordered series of respective logical times. Under transactional consistency, results returned for a database operation, such as a DBFS returning file data or DBMS returning results for a query, are consistent with a logical time referred to herein as a query-consistency time.

An external data source for an external table may be a file stored in a DBFS. A database process executing a query in the DBMS against the external table must access the file stored in the DBFS. Such access entails crossing the OS software layer and then re-entering the DBMS layer and returning back through the OS software layer and then back to the DBMS software layer. Specifically, the database process which is executing in the DBMS software layer enters the OS software layer by invoking an FS API to transmit a FS command, which is then transmitted to a DBFS process that services FS commands. The DBFS process executes within the DBMS software layer to service the FS command and returns results through the OS software layer of the FS API to the database process, which returns to executing in the DBMS software layer.

Even though, in a way the DBMS is calling itself, transactional consistency is not maintained across invocations of the FS software layer of the OS. As a result, execution of a query that accesses an external table stored in a DBFS is associated with a query-consistency time that is different and independent from that of the DBFS process that services the access of the respective external table file and returns file data therefrom.

Advantageously, on the other hand, Consistent External Table Access maintains transactional consistency for queries that access external tables stored in a DBFS. This ability is achieved by bypassing the OS to access the external table file stored in a database-file table. One or more database processes executing a query that access an external table stored in a DBFS access the database-file table like other database tables in the DBMS that can be accessed to execute a query. Based on metadata stored in the DBMS regarding how an external table is stored in a DBFS, a DBMS is able to marshal database processes that access database-file tables directly to execute a query.

Illustrative DBFS

Consistent External Table Access leverages use of a DBFS to store an external table file. Therefore, a description of a DBFS is useful. FIG. 1 depicts an arrangement for implementing a DBFS using a DBMS.

Referring to FIG. 1, DBMS 110 is hosted on computer system 101 and manages Database 112. Database 112 includes Database Dictionary 124, which defines database objects within Database 112. Database objects defined by Database Dictionary 124 include database tables, files or portions thereof that store data for a table, and external tables and data sources for external tables, as described later herein.

DBFS 120 is a DBFS that manages access to files stored in Database 112. DBFS 120 comprises a DBFS process 122, which services file operations commands issued by any of FS client processes 132-1, 132-2, & 132-3 through FS APIs of OS 103.

DBFS process 122 registered DBFS 120 with OS 103 as a FS mounted at mount point /AllPartnersSales. For example, FUSE is a module in Unix and Unix-like OS, such as Linux, that allows a user-space process, such as a database process, to register itself with the OS as a service provider for a user-defined FS. Once the user-defined FS is mounted, the FUSE kernel module registers the FS. Registration of the user-defined FS involves providing an implementation to a pre-defined FS interface (e.g., read( ), write( ), mkdir( ), etc.) by invoking an appropriate system call that is available as part of FUSE.

File operation commands issued through APIs of OS 103 on files with file names that begin with mount point /AllPartnersSales are directed by OS 103 to DBFS process 122. Other files systems may be accessed at other mount points exposed by OS 103. FS client 132-3 invokes APIs of OS 103 to issue FS commands directed to files under mount point /public.

Figure 2:
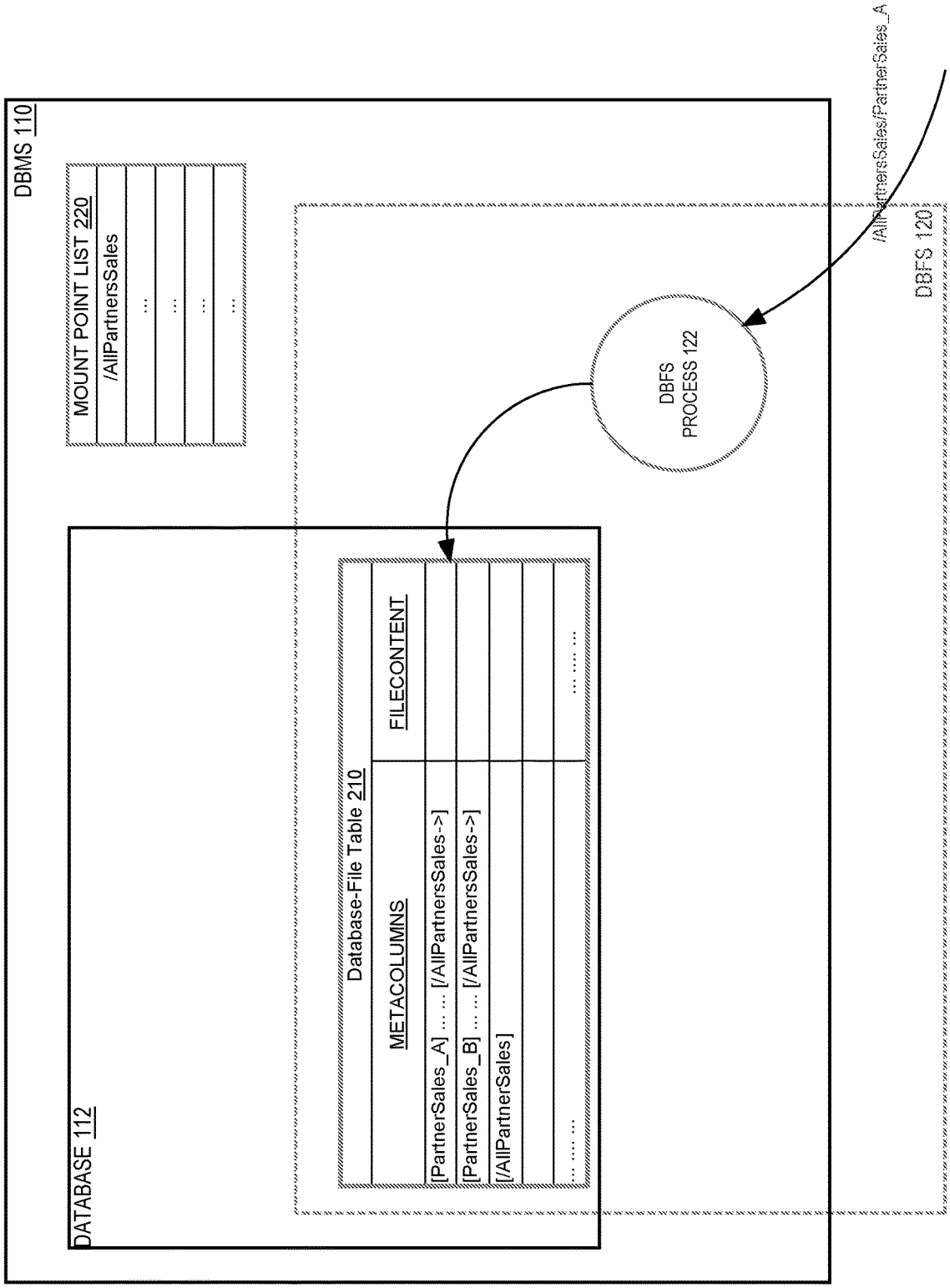
FIG. 2 is a diagram depicting a database file system according to an embodiment of the present invention.

FIG. 2 depicts aspects of DBMS 110 and DBFS 120 in greater detail. These include Database-File Table 210 and Mount Point List 220.

Database-File Table 210 is used by DBFS 120 to store files. The files are stored in column FILECONTENT, with each row in Database-File Table 210 storing a file in column FILECONTENT. Column FILECONTENT may be a large binary object (LOB) column. The files of some rows stored in database-file table 210 are directories, which logically contain one or more files or other directories.

Columns METACOLUMNS contain metadata about the files stored in database-file table 210, each row storing metadata in columns METACOLUMNS about the respective file stored in the row. METACOLUMNS may store such metadata such as the owner or creator of a file, the creation date of the file, the last modification date of the file, the file name, the size of the file, and the file type, and even a link to the row holding the directory of the file.

FIG. 2 depicts DBFS 120 providing access to file /AllPartnerSales/PartnerSales_A to a FS client (not depicted). DBFS process 122 services file operation commands issued by the FS client through FS APIs of OS 103.

External Table Features

Consistent External Table Access exploits the external table functionality of a DBMS. FIG. 3 is provided to describe aspects of external tables that are pertinent to Consistent External Table Access. An external table is defined by issuing a DDL statement describing the external table to DBMS 110. In response to receiving the DDL statement, DBMS 110 generates metadata in a database dictionary describing the various properties of the external table. These properties include a table name, columns and the column names and data types of the columns, and other parameters describing the data source for the external table and how to generate records and column values from the data source.

Referring to FIG. 3, FIG. 3 depicts DDL statement 301. DDL statement 301 is a DDL statement declaring an external table PARTNERSALES_A, for which the data source is external table file /AllPartnersSales/PartnerSales_A stored in DBFS 120. DDL statement 401 specifies three columns and the data types thereof, which are PRODUCT as a character data type, AMOUNT as a currency data type, and DATA as a date data type.

The EXTERNAL clause within the ORGANIZATION clause specifies, inter alia, how the eternal table file for the external table is organized and maps the organization to columns of the external table. Within the EXTERNAL clause, the DIRECTORY clause specifies the directory in which the external table file is stored and the ACCESS PARAMETERS clause specifies how records are organized within the data source and how fields are organized within the records.

In the ACCESS PARAMETERS clause, the "newline" argument in the RECORD DELIMITED BY clause specifies that records in the data source are separated by the newline character. The FIELDS clause maps the columns of the table to fields within a record. The fields are fixed-length fields, and hence the field values within a record are within fixed positions. For example, the FIELDS clause specifies that the column value for PRODUCT can be found in the field of a record stored in the $1^{st}$ through $30^{th}$ position within a record.

The DIRECTORY clause specifies that the directory that stores the external table file is /AllPartnersSales. The LOCATION clause specifies the external table file, which is PartnerSales_A. The directory /AllPartnersSales is the mount point for DBFS 120. In this way, the DDL statement 310 specifies the external table file for external table PARTNERSALES_A is a file stored in DBFS 120, which is PartnerSales_A.

External Table Record Generation

During the execution of the query that references an external table, the DBMS accesses the respective external table file to generate records and column values for records. To generate records and column values, the DBMS generates "record generation parameters", which describe or otherwise define how to generate records and column values from an external table file or other data source.

For example, a DBMS may generate record generation parameters from the metadata stored in Database Dictionary 124 that describes information in the ACCESS PARAMETERS clause of DDL statement 301. The record generation parameters specify that each line in external table file PartnerSales_A contains the data for a record, and specify a mapping of the external table columns to fields in each line, which mirrors the FIELDS clause in the ACCESS PARAMETERS clause.

The DBMS generates records and columns according to the record generation parameters and stores the records in buffers in an external-loading format. An external-loading format is described in Storage-Side Scanning on Non-Natively Formatted Data. The process of generating records and columns from data in an external table file or a data source for storage in a buffer or other data structure usable by the DBMS is referred to herein as external record generation.

Database Data Storage in Files

To access data needed for the execution of database commands that reference database objects, a DBMS must access storage that stores data for the database objects. Typically, data for database objects is stored in database files; data for a particular database object is stored in one or more portions of one or more database files. The portions are sets of contiguous (i.e., contiguous within an address space) data blocks. A database dictionary includes a "storage mapping" that maps database objects to portions of database files that store data for the database objects. The storage mapping is used to determine where to access data for database objects referenced in database commands.

Figure 4:
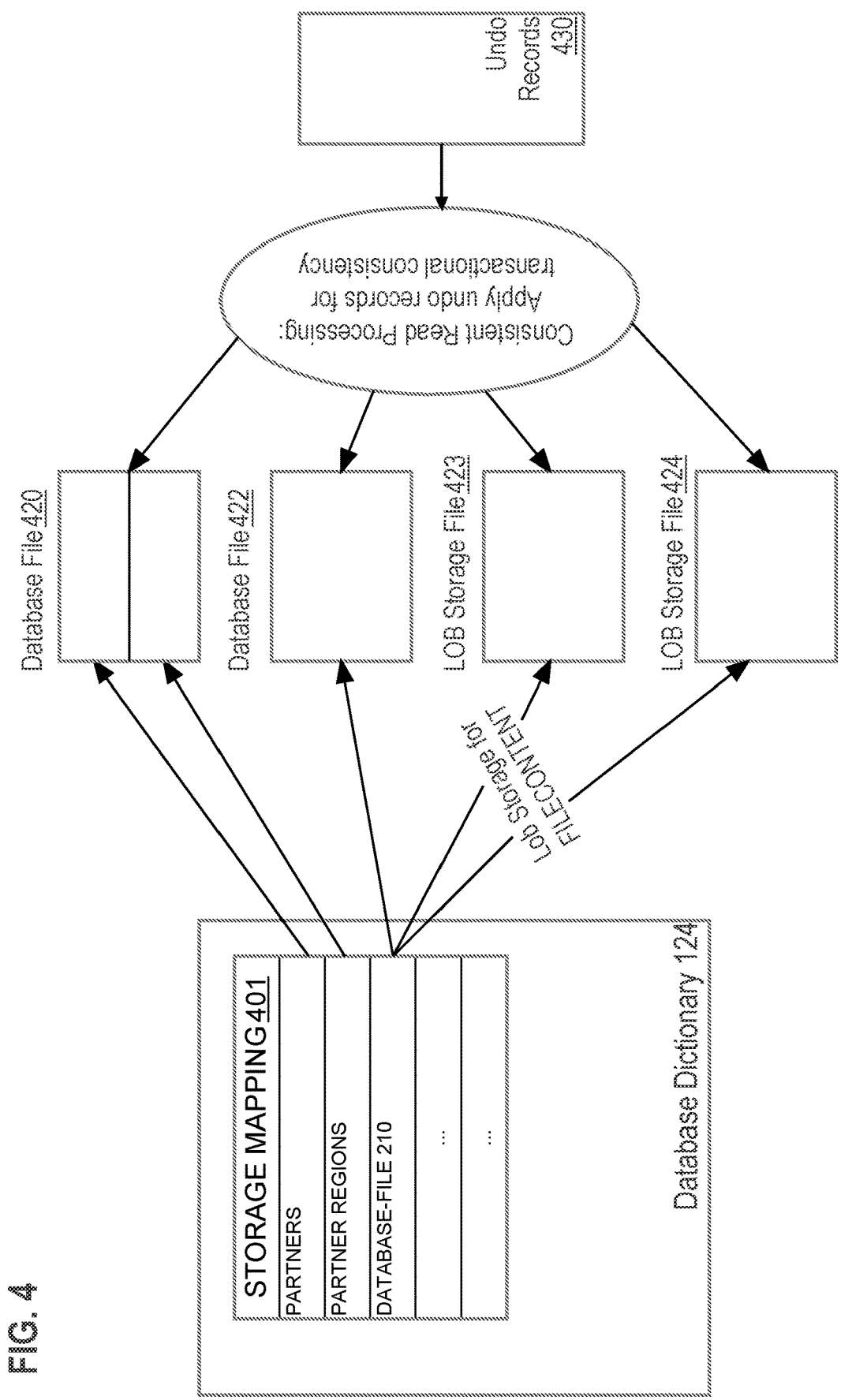
FIG. 4 is a diagram depicting database storage according to an embodiment of the present invention.

Because a database-file table is a database object, Database Dictionary 124 includes a storage mapping that maps database-file table 210 to portions of one or more database files that store data for database-file table 210. FIG. 4 depicts exemplary storage arrangement and storage mapping for Database 112 and Database Dictionary 124.

Referring to FIG. 4, Database Dictionary 124 includes storage mapping 401. Storage mapping 401 includes mappings for tables PARTNERS, PARTNER REGIONS, and database-file 210. Storage mapping 401 maps tables PARTNERS and PARTNER REGIONS to extents within database file 420, and maps database-file table 210 to database file 422. However, data for LOB column FILECONTENT of database-file table 210 is stored in separate database files referred to herein as LOB storage files. Specifically, storage mapping 401 maps FILECONTENT to LOB Storage Files 423 & 424.

When a LOB in a LOB column of a row is stored in LOB storage files, the LOB is referred to as being stored out-of-line. A LOB stored in-line within a LOB column of a row is completely stored in a data block along with other column values of the row. If the LOB is stored out-of-line, a LOB pointer is stored in the data block. The LOB pointer refers to the location of the respective LOB in LOB storage files.

Consistent-Read Operations

As mentioned before, Consistent External Table Access provides transactional consistency as part of the transaction processing capability of a DBMS. In transaction processing, changes to database objects are made by transactions. A transaction is a set of operations that change persistent database objects. All the changes for a transaction are made atomically. The changes are made permanent by committing the transaction. If the transaction cannot be committed or is aborted or otherwise not committed, the transaction is rolled back.

In transaction processing in a DBMS, changes made by transactions to database objects entail changes to data blocks that store data for the database objects. These changes are recorded in change records, which may include redo records and undo records. Redo records may be used to reapply changes made to a data block by a transaction. Undo records are used to reverse or undo changes made to a data block by a transaction.

Undo records are used to provide transactional consistency by performing operations referred to herein as "consistent-read operations". Each undo record is associated with a logical time. For data blocks that are read to compute a query, a DBMS applies the needed undo records to copies of the data blocks to bring the copies to a state consistent with the query-consistency time of the query. The DBMS determines which undo records to apply to a data block based on the respective logical times associated with the undo records. The term consistent-read operations refers to operations performed on database data to ensure it is consistent with a query-consistency time. Such operations include applying undo records to data blocks as described previously. Another example of a consistent-read operation is examining transaction metadata in a data block to determine whether data in the data block is or is not transactionally consistent with a query-consistency time. Applying a redo record to the data block may be performed in response to a determination that the data block is not transactionally consistent with the query-consistency time.

FIG. 4 depicts undo records 430. The undo records may be stored in one or more files not depicted as separate undo record logs. Undo records 430 are used to perform consistent-read processing for queries, thereby providing transactional consistency for DBMS 110's execution of queries.

As mentioned previously, file data returned by DBFS 120 is transactionally consistent with a query-consistency time. The query-consistency time is established when, for example, a DBFS client opens a file by sending an open file command to DBFS 120. This transactional consistency is provided using consistent-read operations.

Consistent-read operations require that database processes involved in executing a query have access to a transaction context generated based on a query-consistency time. A transaction context includes metadata about a transaction being executed by a set of database processes. Much of the transaction context is stored in memory accessible to the data processes, even as the database processes invoke various software layers of DBMS software when executing a query. In addition, database processes may invoke internal APIs of DBMS software layers to access the transaction context. However, when invoking an OS layer for a FS, access to both memory storing the transaction context and to the internal APIs that access the transaction context is lost and/or prevented, even after invoking a software layer of the DBMS within the invocation of the OS layer.

A database process that has access to a transaction context and the internal APIs of the DBMS software layers for accessing the transaction context is referred to herein as executing within the transaction context.

Consistent External Table Access

When a query executes against an external table, a database process involved in executing the query accesses the external table file storing external data for the external table. The database process accesses the external table file by invoking internal DBMS FS APIs of the DBMS that are implemented in DBMS software for accessing files stored in OS exposed FSs. Invoking the DBMS FS APIs invokes the OS layer, which causes loss of the transaction context.

However, in Consistent External Table Access, the DBMS FS API is configured to cause a database process to detect that an external table file is stored in DBFS 120, and in response, to bypass invoking the OS layer and instead access internal DBFS APIs in the DBMS software layer that generate file data from the database-file table. The transaction context is not lost as these DBFS APIs maintain access to the transaction context. In this way, the consistent-read processing and other operations performed by the database process within the transaction context of a query is maintained according to the query-consistency time of the query's transaction context.

Figure 5:
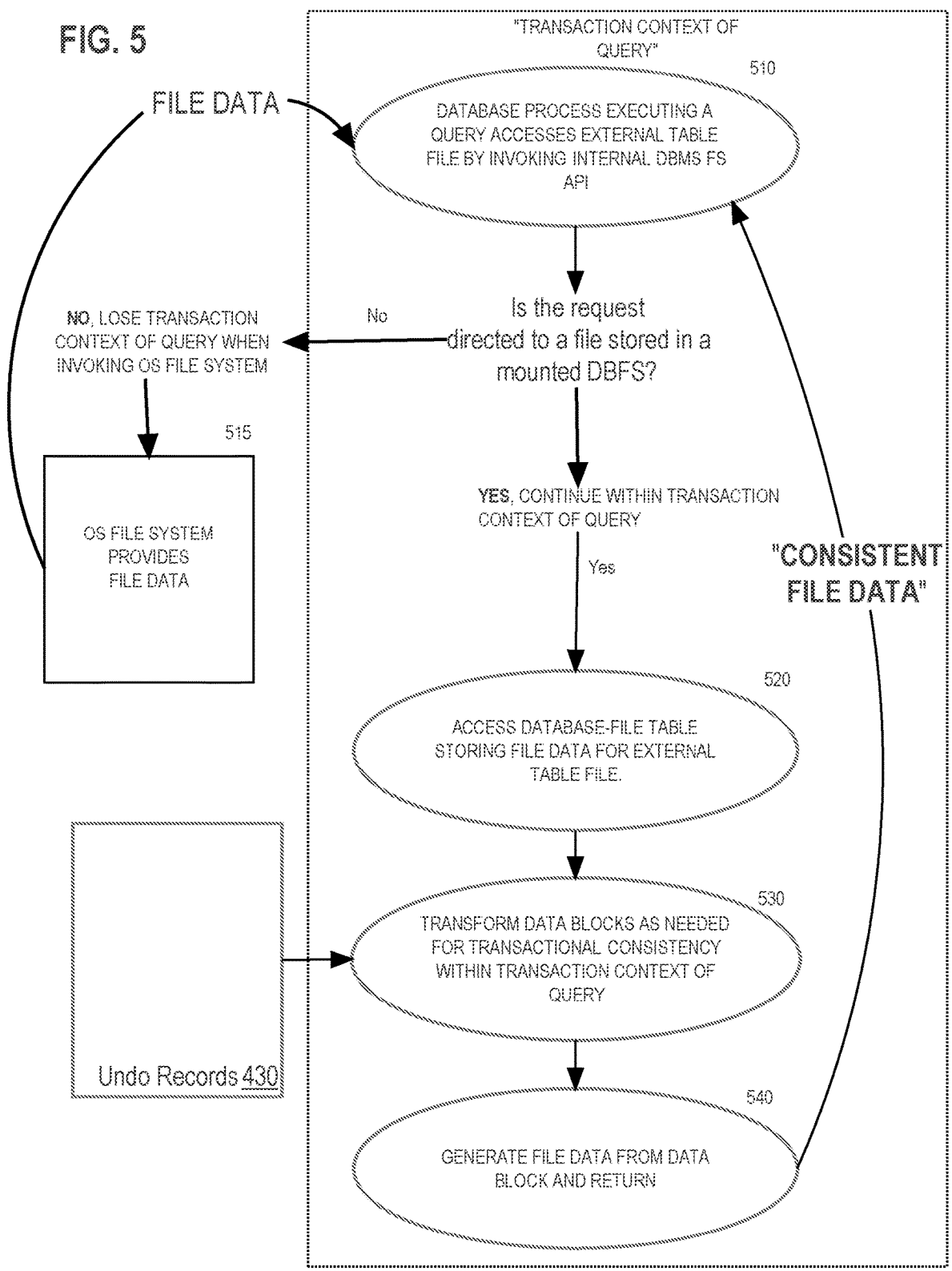
FIG. 5 is a diagram depicting a flow of operations and data for Consistent External Table Access according to an embodiment of the present invention.

FIG. 5 depicts a procedure used for Consistent External Table Access. The procedure is performed by a database process participating in the execution of a query that references external table PARTNERSALES_A, the execution being performed according to a query-consistency time. In this example, DBMS 110 compiles the query.

During the compilation, DBMS 110 determines that the external table file must be accessed to extract the columns values for PARTNERSALES_A.

(510) To retrieve data for the query from the external table file when executing the query, the database process accesses the external table file by invoking an internal DBMS FS API to transmit an open file command to open external table file PartnerSales_A.

Next, the database process determines whether the open file command is directed to an external table accessible in a mounted DBFS. The determination is made by examining Mount Point List 220 to determine whether the file command is directed to a file under a mount point listed in Mount Point List 220. /AllPartnerSales/PartnerSales_A is under a mount point listed in Mount Point List 220, that is, listed under mount point /AllPartnerSales.

(520) In response to determining that the file command is directed to an external table accessible in a mounted DBFS, the database process accesses the database-file table for the external table by invoking an internal DBFS API. Because an internal DBFS API is invoked directly, i.e., without invoking an FS API of an OS, the database process continues executing within the current transaction context. (530) In addition, accessing the database-file table includes performing consistent-read operations, which may entail applying undo records 430 to data blocks read from the data-base table.

In the current example, the database process invokes an internal DBFS API to access database-file table 210 to find and access the row in database-file 210 storing external table file PartnerSales_A. Such access may include consistent-read processing as described previously. The database process then forms a file descriptor, which is used to later access the external table file in subsequent invocations of the internal DBMS FS APIs and internal DBFS APIs. The file descriptor includes information about the external table PARTNERSALES_A and the current state of accessing of access external table file PartnerSales_A. Such information may include a LOB pointer pointing to a LOB storage file storing the external table PARTNERSALES_A.

(540) File data is returned from current invocations of internal DBMS FS APIs and internal DBFS APIs. In the current illustration, the file descriptor is returned.

Next, the database process invokes an internal DBMS FS API to send a file command to read data blocks from external table file /AllPartnerSales/PartnerSales_A. (510). The database process then determines that the file command is directed to a file accessible in a mounted DBFS. (520) The determination is made by examining Mount Point List 220 as described before. Alternatively, a flag in the file descriptor may specify that the file is accessible in a mounted DBFS. The flag was set in this way when the file descriptor was formed as previously described.

Next, the database process invokes the internal DBFS API for accessing database-file table 210 to retrieve LOB data storing the file data requested. (530) Retrieving the file data entails accessing data blocks in LOB storage Files 423 and/or 424. Consistent-read operations may be applied to the data blocks as described previously. The data blocks are returned from current invocations of internal DBMS FS APIs and internal DBFS APIs as file data that is consistent with the query consistency time of the current transaction context.

(515) If a file command had been determined to be directed to an external table not accessible in a mounted DBFS, then the database process invokes the OS FS API and ceases to execute within the transaction context.

Scan-Enabled Storage Systems

In an embodiment, Consistent External Table Access exploits an enhanced storage system referred to herein as a "scan-enabled storage system", which is a storage system capable of storage-side scanning. In storage-side scanning, a scan-enabled storage system projects columns and filters rows stored in data blocks that either conform to the native database storage format of the DBMS or that hold external table file data for an external table defined by a DBMS. To cause a scan-enabled storage system to project columns and filter rows stored in data blocks, the DBMS issues a "storage-side scan request" to the scan-enabled storage system. The storage-side scan request specifies the data blocks to read, and scanning criteria, which includes projecting criteria that specify columns to project and filtering criteria that specify criteria that one or more columns of rows must satisfy.

In storage-side scanning, data blocks stored in a scan-enabled storage system may, in various circumstances, be evaluated and filtered by either the scan-enabled storage system or the DBMS. For data blocks that the scan-enabled storage system evaluates, the scan-enabled storage system returns result data blocks containing values for projected columns of rows that the scan-enabled storage system filtered. The result data blocks may contain column values and rows from multiple data blocks from which the scan-enabled storage system extracted rows and their column values.

When a scan-enabled storage system does not evaluate a data block specified by storage-side scan request, the scan-enabled storage system returns the data block to the DBMS. Such data blocks are referred to herein as unprocessed data blocks. The DBMS evaluates unprocessed data blocks.

The ability for returning unprocessed data blocks is useful for transactional consistency. When processing a storage-side scan request, a scan-enabled storage system processes the request according to a query consistency time. The scan-enabled storage system is able to determine, based on the query consistency time and transactional metadata in a data block, whether the data block may require application of consistent-read operations to render the data block transaction consistent. If so, then the scan-enabled storage system treats the data block as an unprocessed data block and returns the data block to the DBMS. The DBMS may then apply consistent-read operations on the unprocessed data block before filtering records in the data block.

To perform projection or filtering on data blocks that store external table file data, a scan-enabled storage system depends on input provided by a DBMS in a storage-side scan request. Such input includes record generation parameters.

The scan-enabled storage system uses the record generation parameters to perform external record generation to generate records with columns. The scan-enabled storage system filters records based on the column values therein and based on filtering criteria specified by the storage-side scan request. The filtered records are further processed to include projected columns and to exclude non-projected columns. The records are then stored in result data blocks in, for example, an external loading format.

Generating Execution Plans for Storage-Side Scanning

To execute a query, a DBMS compiles the query to generate an execution plan for execution. An execution plan defines operations to be performed to execute a query and an order for performing the operations. Such operations are referred to herein as plan operations. A DBMS may execute the execution plan as a distributed operation. The execution plan divides many kinds of plan operations into work granules, some of which may be executed in parallel.

An execution plan generated for storage-side scanning may include multiple work granules that generate rows from a data source. Such work granules are referred to herein as external work granules. Each external work granule entails generating rows for a respective portion of the data source. Each external work granule of the execution plan may be executed, at least in part, by a scan-enabled storage system that generates rows from the portion. The rows may be projected or filtered according to scanning criteria associated with the external work granule.

According to an embodiment, during a DBMS's compilation of a query that references an external table, the DBMS determines that the respective external table file is stored in a scan-enabled storage system. In response, the DBMS generates external work granules; when each external work granule is executed by a database process, the work granule generates rows for a portion of the external table file, the rows being filtered and containing projected columns according to the scanning criteria. The rows are generated by issuing storage-side scan requests directed to a portion of the external table file.

Figure 6:
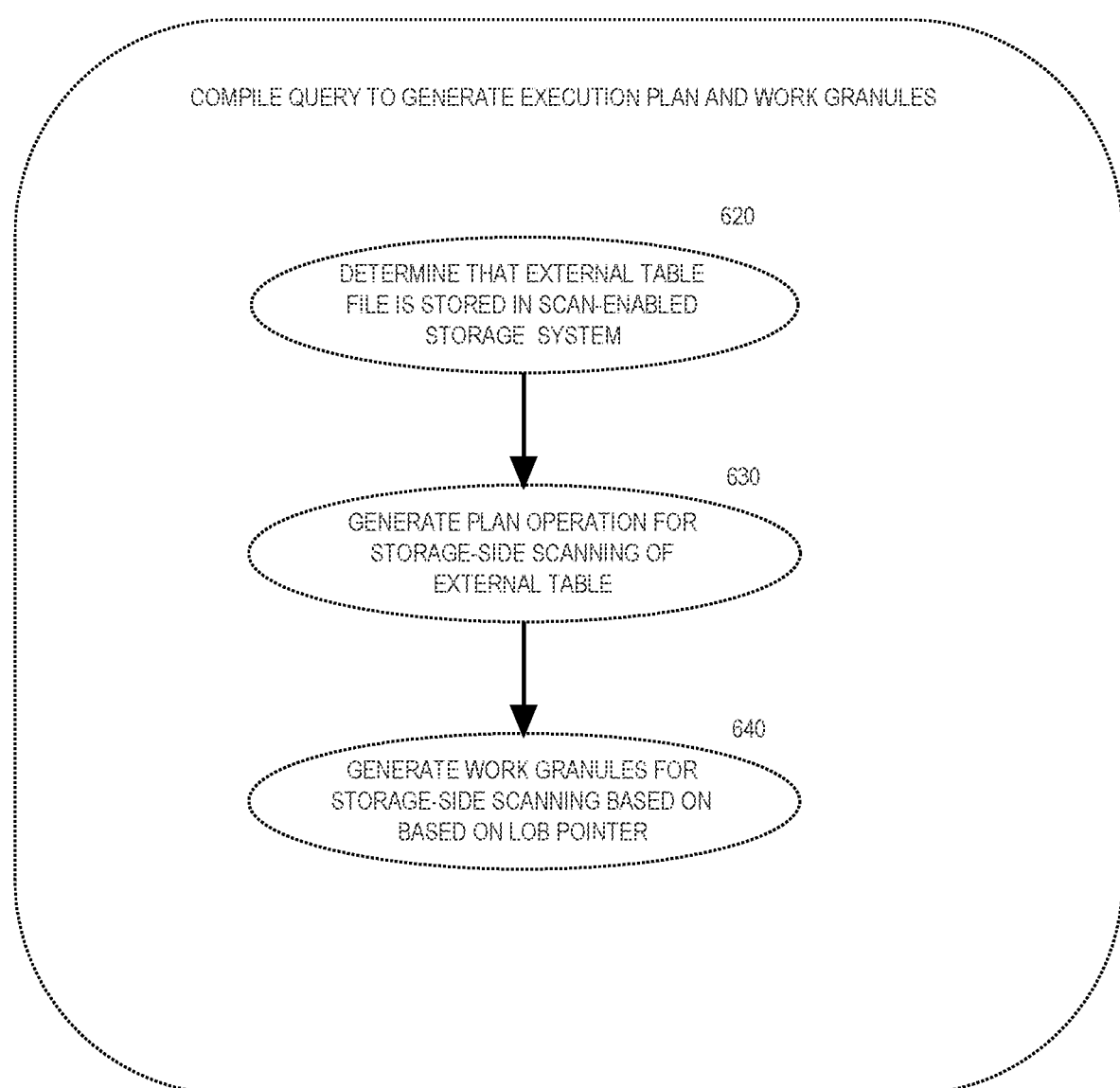
FIG. 6 is a diagram depicting a flow of operations and data for Consistent External Table Access that uses a scan-enabled storage system according to an embodiment of the present invention.
Figure 7:
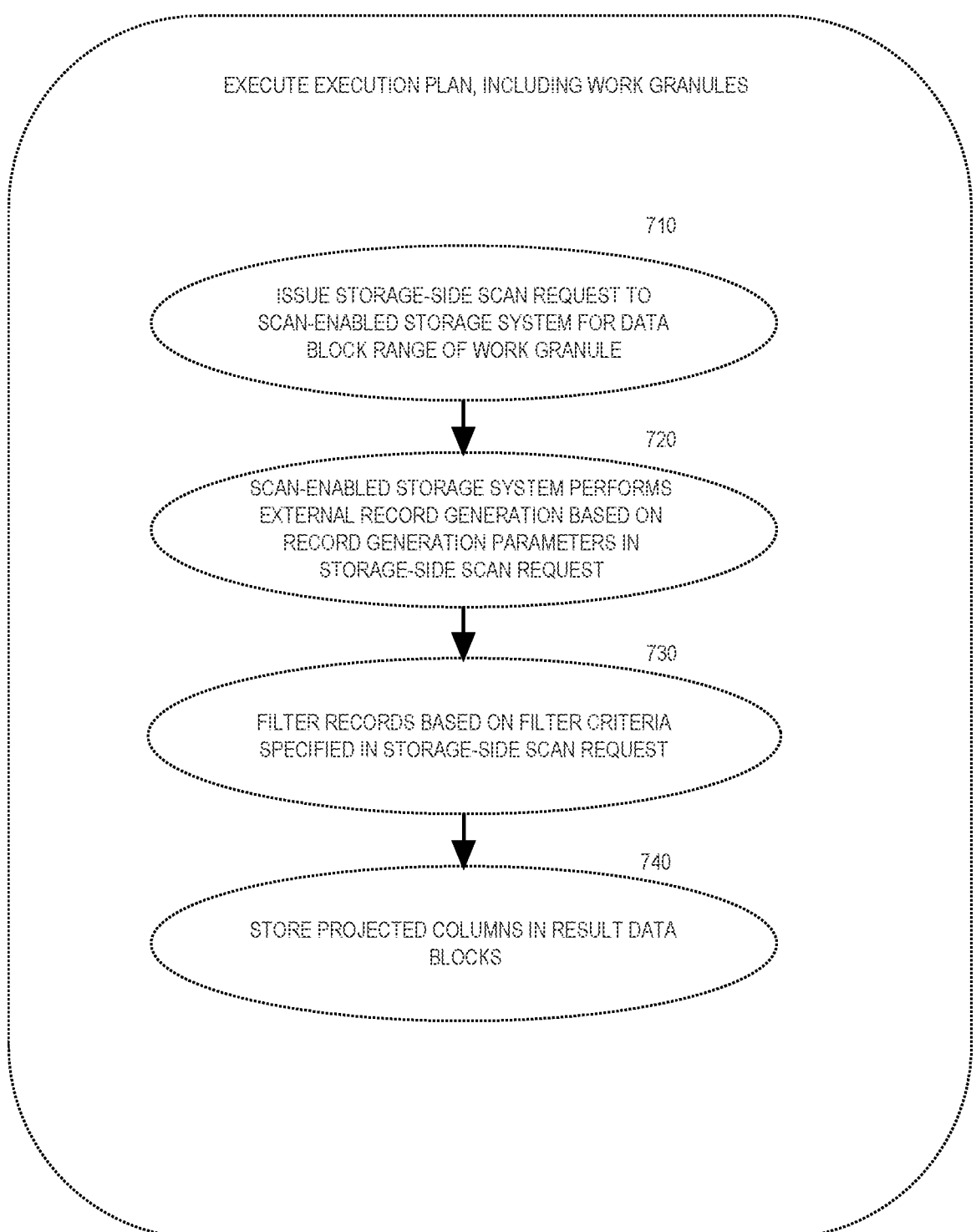
FIG. 7 is a diagram depicting a procedure performed by a DBMS to execute the external work granule when executing an execution plan generated by the query compilation.

FIG. 6 depicts a procedure performed during the compilation of a query by a DBMS to generate external work granules for executing the query that references an external table, where the respective external table file is stored in a scan-enabled storage system. FIG. 7 depicts a procedure performed by a DBMS to execute the external work granules when executing an execution plan generated by the query compilation.

Compiling Query to Generate Execution Plan and External Work Granules

Referring to FIG. 6, (620) the DBMS determines that the external table file is stored in a scan-enabled storage system. This determination itself involves several determinations. First, the DBMS examines Mount Point List 220 to determine that the external table file is under a mount point for a DBFS listed in Mount Point List 220. If so, the DBMS determines that the respective database-file table for the mounted DBFS is mapped to files in a scan-enabled storage system.

(630) In response to determining that the external table file is stored in scan-enabled storage, the DBMS generates an execution plan operation for storage-side scanning of the external table file.

(640) The DBMS generates one or more external work granules for the plan operation. Each external work granule specifies to scan a range of data blocks of a portion of the external table file that stores the external table. The portion is determined by locating the row in the database-file table that stores the external table file, and reading the LOB pointer for the row. Based on the LOB pointer, and the storage mapping for the LOB column of the database-file table, the DBMS determines one or more subranges of data blocks to assign to an external work granule. When a database process is assigned a work granule, the database process issues storage-side scan requests for one or more subranges assigned to the work granule.

Execute External Work Granules During Execution of Execution Plan

FIG. 7 depicts a procedure performed to execute an external work granule assigned to the database process on the DBMS to execute an execution plan.

(710) The database process issues storage-side scan requests to the scan-enabled storage system. The request specifies at least a portion of a subrange of data blocks assigned to the external work granule.

(720) The scan-enabled storage system receives the storage-side scan request from the database process. In response, the scan-enabled storage system performs storage-side scanning for the range of data blocks specified by the storage-side scan request. For each data block in the range that does not require the application of consistent-read operations, the scan-enabled storage system performs external record generation based on the record generation parameters specified in the storage-side scan request.

(730) The scan-enabled storage system filters rows generated for each data block according to filter criteria included in the scanning criteria. (740) For particular rows that satisfy the filtering criteria, the scan-enabled storage system stores the values therein of the projected columns in result data blocks and returns the result data blocks to the database process.

A database process executing an external work granule may be one of multiple slave processes marshaled to execute the external work granules. Multiple slave processes may concurrently issue storage-side scan requests to a scan-enabled storage system that comprises multiple servers. Thus, multiple servers may concurrently execute storage-side scan requests, thereby performing parallel execution of storage-side scanning across multiple servers in a way that enables transactional consistency while improving performance and run time.

Database Storage Format Clarification

At a higher level, an external table file data is stored in a native database storage format as LOB column data. LOB column data is stored in data blocks according to a native database storage format. The native database storage format includes transaction metadata that can be used by a DBMS for transaction processing and consistent-read operations to ensure LOB column data of a row is consistent with a given query-consistency time.

However, the LOB column data at a record level and column level of the external table may not be consistent with the native database storage format. For example, in a native database storage format, rows in a data block are run length encoded. Each row is delimited by a row delimiter that includes an offset to a next row stored in the data block. The column values in a row in the data block may also be run length encoded by column delimiters that each contain an offset to a subsequent column. In addition, the column values may be dictionary encoded by a dictionary stored in the data block or a dictionary used to encode a set of data blocks. The data in a data block may encrypted by an encryption algorithm applied by the DBMS. A data block includes transaction metadata in a data block usable by the DBMS. The transaction metadata may, for example, specify which rows therein are locked by a transaction that is identified by the transaction metadata. For records stored in an external table file, the records in a data block are stored in an external format that is different than the native database storage format. The records may be separated by a record delimiter, such as new line character, and each column value may be delimited by, for example, a comma, semicolon, or tab character. The data blocks that stored the record may not include transaction metadata usable by a DBMS, if any.

DBMS Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database.

Changes to a database in a DBMS are made using transaction processing. A database transaction is a set of operations that change database data. In a DBMS, a database transaction is initiated in response to database statement requesting a change, such as DML statement requesting as an update, insert of a row, or a delete of a row. Committing a transaction refers to making the changes for a transaction permanent.

Under transaction processing, all the changes for a transaction are made atomically. When a transaction is committed, either all changes are committed, or the transaction is rolled back. DML statements or commands refer to statements that specify to change data, such as INSERT and UPDATE statement. A DML statement or command does not refer to statement that merely queries database data.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be an computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Transaction Processing Overview

In transaction processing, changes to persistent data objects are made by transactions. A transaction is a set of operations that change persistent data objects. All the changes for a transaction are made atomically. The changes are made permanent by committing the transaction. If the transaction cannot be committed, or is aborted or otherwise not committed, the transaction is rolled back.

Transaction processing, as the term is used herein, also requires journaling. In journaling, changes made by a transaction to a persistent data object are stored in a persistent journal. A persistent journal comprises journal records that record changes made by a transaction to a data object. Each record may specify what field, column, elements, or portion of a data object were changed and the new values thereof created by the change. The old values that were replaced by the new value may also be specified.

In write-ahead journaling, journal records for changes made by a transaction are stored persistently before committing a transaction and/or to reach a prepared state. In addition, the journal can be read by other PSSs to replicate persistent data objects.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
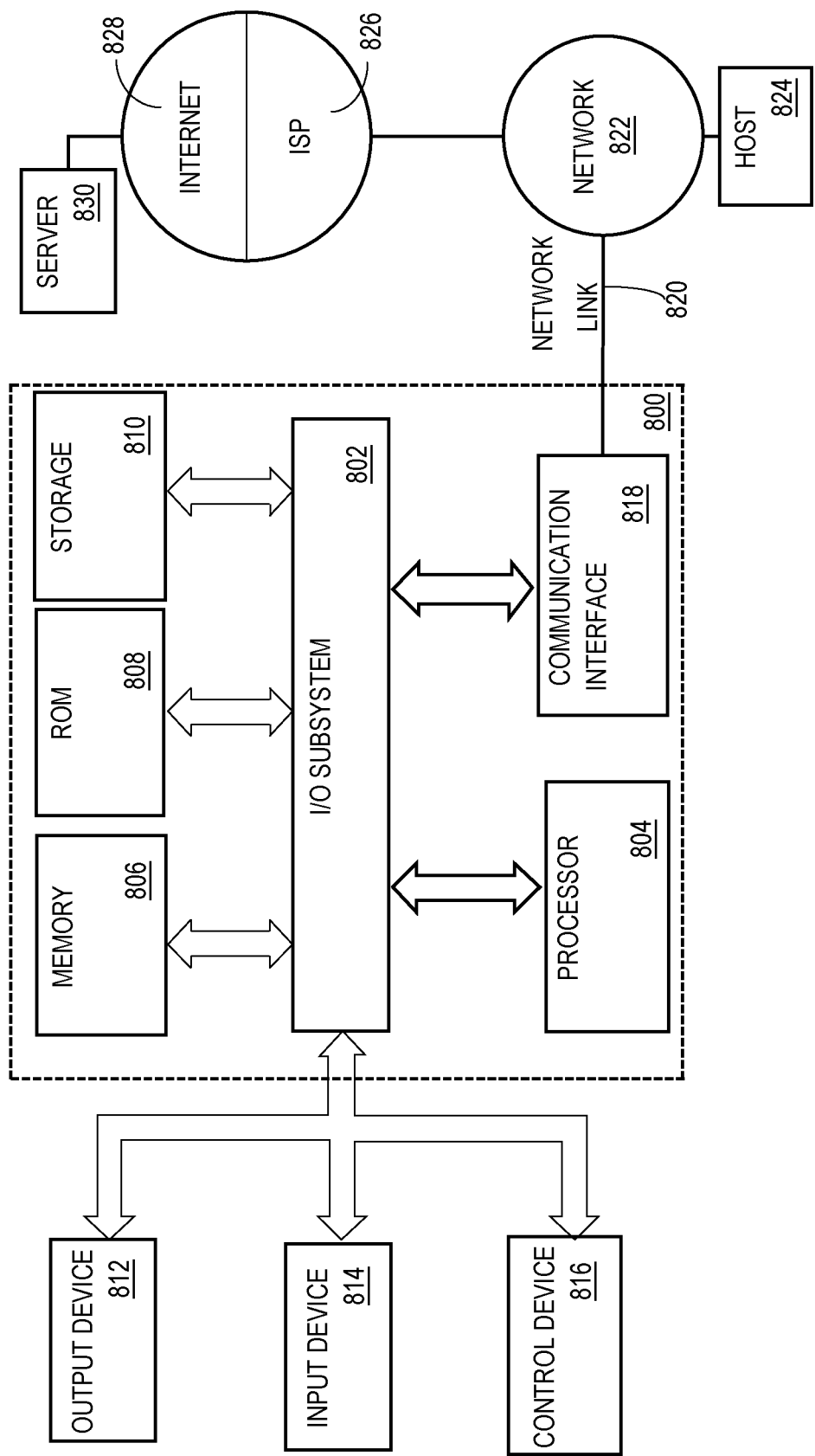
FIG. 8 is a diagram depicting a computer system that may be used to implement an embodiment of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
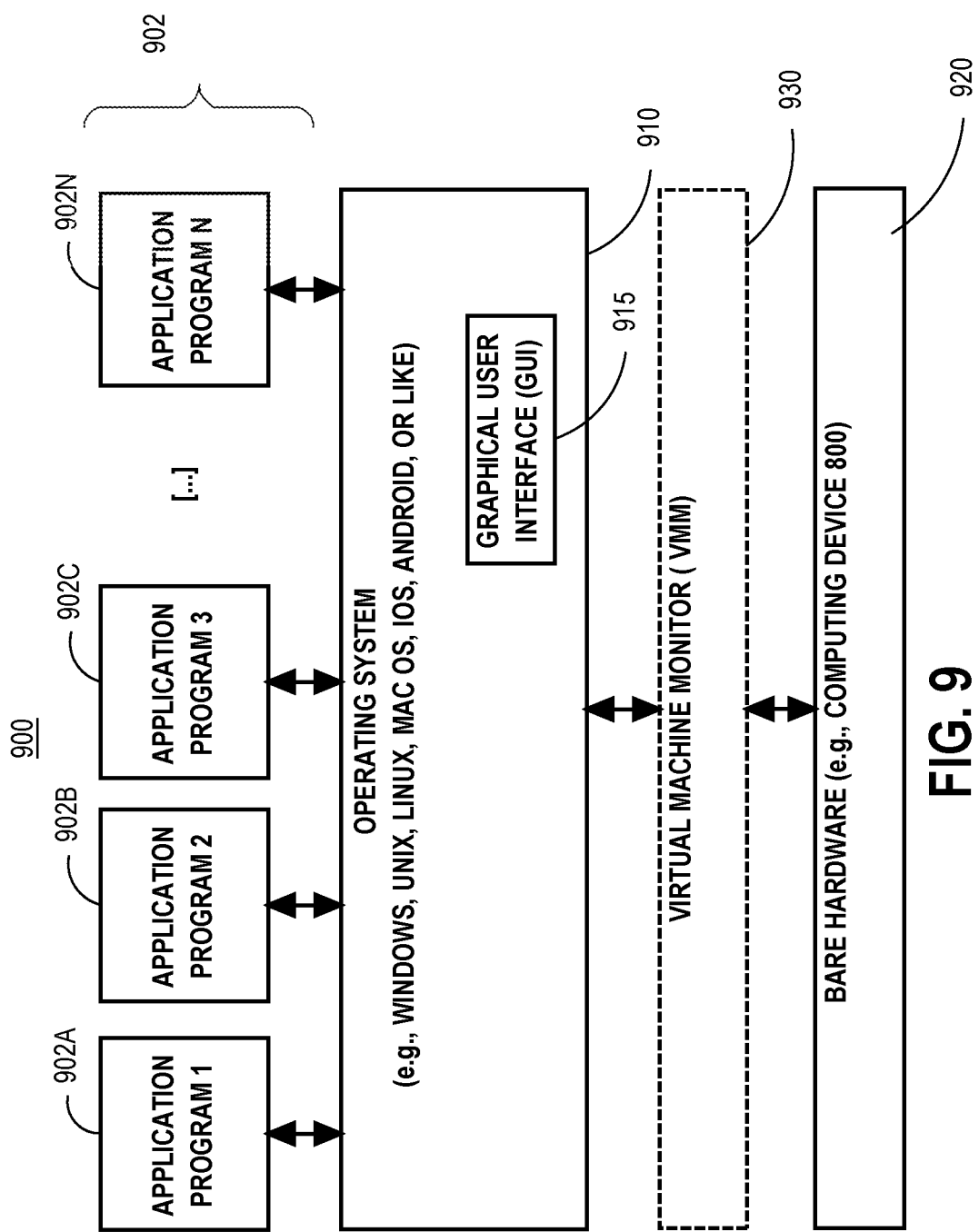
FIG. 9 depicts a software system that may be employed for controlling the operation.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 1106 and on fixed storage (e.g., hard disk or flash memory) 1110, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 1110 into memory 1106) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 1104) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   a database management system (DBMS) receiving a query that references an external table that is stored in an external table file in a database file system (DBFS) that stores files in a database managed by said DBMS; and
   executing said query, wherein executing said query returns query results that are transactionally consistent with a query-consistency time associated with said query, wherein executing said query includes:
a database process executing within a transaction context based on said query consistency time, wherein said transaction context comprises metadata about a transaction associated with the query, and executing within the transaction context comprises the database process having access to at least the transaction context;
determining that said external file is stored within said DBFS;
in response to determining that said external table file is stored within said DBFS, retrieving external data from said external table file, while continuing to execute within said transaction context; and
generating transactionally consistent data that is transactionally consistent with said query consistency time by at least applying consistent-read operations to said external data.

2. The method of claim 1, wherein retrieving said external data from said external table file while continuing to execute within said transaction context is performed without calling an operating system file system application programming interface (API) for a mount point of said DBFS.

3. The method of claim 1, wherein applying said consistent-read operations to said external data includes applying undo records to data blocks of said database that store at least a portion of said external table file.

4. The method of claim 1, wherein determining that said external file is stored within said DBFS includes determining that said external table file is stored within a mount point of said DBFS.

5. The method of claim 1, wherein columns of said external table are not stored in native format supported by said DBMS within said external table file.

6. The method of claim 5, wherein said external table file is stored within a large binary object (LOB) column of a database-file table of said database.

7. The method of claim 1, wherein executing said query further comprises:
issuing storage-side scan requests to a scan-enabled storage system that stores said external table file; and
wherein in response to receiving said storage-side scan requests, said scan-enable storage system performs:
said retrieving external data from said external table file, and
said generating transactionally consistent data that is transactionally consistent with said query consistency time by at least applying consistent-read operations to said external data.

8. The method of claim 1, wherein generating transactionally consistent data includes generating rows and column values from data blocks that store data for said external table file.

9. One or more non-transitory computer-readable media storing one or more sequences of instructions that, when executed by one or more processors, cause:
a database management system (DBMS) receiving a query that references an external table that is stored in an external table file in a database file system (DBFS) that stores files in a database managed by said DBMS; and
executing said query, wherein executing said query returns query results that are transactionally consistent with a query-consistency time associated with said query, wherein executing said query includes:
a database process executing within a transaction context based on said query consistency time, wherein said transaction context comprises metadata about a transaction associated with the query, and executing within the transaction context comprises the database process having access to at least the transaction context;
determining that said external file is stored within said DBFS;
in response to determining that said external table file is stored within said DBFS, retrieving external data from said external table file, while continuing to execute within said transaction context; and
generating transactionally consistent data that is transactionally consistent with said query consistency time by at least applying consistent-read operations to said external data.

10. The one or more non-transitory computer-readable media of claim 9, wherein retrieving said external data from said external table file while continuing to execute within said transaction context is performed without calling an operating system file system application programming interface (API) for a mount point of said DBFS.

11. The one or more non-transitory computer-readable media of claim 9, wherein applying said consistent-read operations to said external data includes applying undo records to data blocks of said database that store at least a portion of said external table file.

12. The one or more non-transitory computer-readable media of claim 9, wherein determining that said external file is stored within said DBFS includes determining that said external table file is stored within a mount point of said DBFS.

13. The one or more non-transitory computer-readable media of claim 9, wherein columns of said external table are not stored in native format supported by said DBMS within said external table file.

14. The one or more non-transitory computer-readable media of claim 13, wherein said external table file is stored within a large binary object (LOB) column of a database-file table of said database.

15. The one or more non-transitory computer-readable media of claim 9, wherein executing said query further comprises:
issuing storage-side scan requests to a scan-enabled storage system that stores said external table file; and
wherein in response to receiving said storage-side scan requests, said scan-enable storage system performs:
said retrieving external data from said external table file, and
said generating transactionally consistent data that is transactionally consistent with said query consistency time by at least applying consistent-read operations to said external data.

16. The one or more non-transitory computer-readable media of claim 9, wherein generating transactionally consistent data includes generating rows and column values from data blocks that store data for said external table file.

* * * * *

UNITED STATES PATENT AND TRADEMARK OFFICE
CERTIFICATE OF CORRECTION

PATENT NO. : 12,242,458 B2
APPLICATION NO. : 17/588844
DATED : March 4, 2025
INVENTOR(S) : Susairaj et al.

Page 1 of 1

It is certified that error appears in the above-identified patent and that said Letters Patent is hereby corrected as shown below:

In the Drawings

On sheet 6 of 9, under Reference Numeral 640, FIG. 6, Lines 2-3, delete "BASED ON BASED ON" and insert -- BASED ON -- therefor.

Signed and Sealed this
Third Day of June, 2025

Coke Morgan Stewart
*Acting Director of the United States Patent and Trademark Office*